United States Patent
Widener et al.

(10) Patent No.: US 10,099,322 B2
(45) Date of Patent: Oct. 16, 2018

(54) METHODS FOR COLD SPRAY REPAIR

(71) Applicants: Christian Widener, Rapid City, SD (US); Adam Well, Rapid City, SD (US); Owen Britton, Rapid City, SD (US); Brian James, Rapid City, SD (US); Rob Hrabe, Rapid City, SD (US); Victor Champagne, Rapid City, SD (US)

(72) Inventors: Christian Widener, Rapid City, SD (US); Adam Well, Rapid City, SD (US); Owen Britton, Rapid City, SD (US); Brian James, Rapid City, SD (US); Rob Hrabe, Rapid City, SD (US); Victor Champagne, Rapid City, SD (US)

(73) Assignees: South Dakota Board of Regents, Pierre, SD (US); The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/066,443

(22) Filed: Oct. 29, 2013

(65) Prior Publication Data
US 2014/0115854 A1    May 1, 2014

Related U.S. Application Data

(60) Provisional application No. 61/719,636, filed on Oct. 29, 2012, provisional application No. 61/719,641, (Continued)

(51) Int. Cl.
*B24C 1/08*     (2006.01)
*B24C 3/32*     (2006.01)
(Continued)

(52) U.S. Cl.
CPC ........ *B23P 6/00* (2013.01); *B05B 7/16* (2013.01); *B64F 5/40* (2017.01); *C23C 24/04* (2013.01);
(Continued)

(58) Field of Classification Search
CPC ..... B23P 6/00; B05B 7/16; B05B 1/24; B05B 7/1481; B05B 7/1486; B05B 7/1606;
(Continued)

(56) References Cited

U.S. PATENT DOCUMENTS 2,511,627 A *   6/1950   Einbecker ............. B05B 7/0408
                                                                                 118/600
2,714,563 A     8/1955   Poorman et al.
(Continued)

FOREIGN PATENT DOCUMENTS

EP         2261057 B1 * 12/2015 ............... B44F 1/04
EP         2175050 B1 *   9/2016 ............ C23C 24/04

OTHER PUBLICATIONS

Review on Cold Spray Process and Technology—Part I; Intellectual Property; Journal of Spray Technology, vol. 17 (4); Dec. 2008, pp. 495-516.*

(Continued)

*Primary Examiner* — Bayan Salone
(74) *Attorney, Agent, or Firm* — Goodhue, Coleman & Owens, P.C.

(57) ABSTRACT

Methods for aircraft component repair and reclamation are provided. Cold spraying aircraft panels include identifying a fastener hole in an aircraft panel in need of repair, capturing the location of the fastener hole, and depositing cold spray material about the fastener hole for reclaiming the aircraft panel. Any excess material may be removed. Cold spraying hydraulic lines includes identifying a surface of the hydraulic line in need of repair, aiming a cold spray nozzle at the surface of the hydraulic line and depositing a cold spray (Continued)

material on the surface of the hydraulic line. Excess cold spray material may be removed as needed.

20 Claims, 13 Drawing Sheets

Related U.S. Application Data filed on Oct. 29, 2012, provisional application No. 61/719,632, filed on Oct. 29, 2012.

(51) Int. Cl.

| | | |
|---|---|---|
| *B05B 7/16* | (2006.01) | |
| *B05B 7/14* | (2006.01) | |
| *B05B 1/24* | (2006.01) | |
| *B64F 5/00* | (2017.01) | |
| *B23P 6/00* | (2006.01) | |
| *C23C 24/04* | (2006.01) | |
| *B64F 5/40* | (2017.01) | |

(52) U.S. Cl.
CPC .... *Y10T 29/49718* (2015.01); *Y10T 29/49723* (2015.01); *Y10T 29/49746* (2015.01); *Y10T 29/49748* (2015.01)

(58) Field of Classification Search
CPC ..... B05B 7/1613; B05B 7/1626; B05B 7/162; B05B 7/1693; C23C 24/04; B64F 5/0081; Y10T 29/49718; Y10T 29/49746; Y10T 29/49748; B05C 5/001; B24C 1/086; B24C 3/32; B24C 3/325
USPC .............. 29/402.18, 402.01, 402.04, 402.19; 239/135; 451/38–41, 51, 61; 427/453–456, 140, 142, 180, 190, 191, 427/203, 292, 367, 422
See application file for complete search history.

(56) References Cited

U.S. PATENT DOCUMENTS

| | | | | |
|---|---|---|---|---|
| 3,246,392 A * | 4/1966 | Altgelt | | 228/103 |
| 3,445,914 A * | 5/1969 | Altgelt | | 228/119 |
| 3,924,806 A * | 12/1975 | Schowiak | | B05B 7/32 239/427 |
| 3,970,221 A * | 7/1976 | Fleischer | | B05B 12/002 222/148 |
| 3,989,984 A * | 11/1976 | Amason | | B29C 70/885 244/1 A |
| 4,005,825 A * | 2/1977 | Schowiak | | B05B 7/32 239/413 |
| 4,586,854 A * | 5/1986 | Newman | | B05B 7/1404 137/888 |
| 4,599,255 A * | 7/1986 | Anglin | | B29C 70/885 244/117 R |
| 5,799,876 A * | 9/1998 | Isler | | B29B 7/7438 239/306 |
| 6,227,228 B1 * | 5/2001 | Fullenbach | | B01F 15/00025 134/102.1 |
| 6,370,752 B1 * | 4/2002 | Anderson | | B23P 6/005 29/402.09 |
| 6,491,208 B2 * | 12/2002 | James et al. | | 228/119 |
| 6,502,767 B2 * | 1/2003 | Kay et al. | | 239/433 |
| 6,722,584 B2 * | 4/2004 | Kay et al. | | 451/439 |
| 6,905,728 B1 * | 6/2005 | Hu et al. | | 427/142 |
| 7,000,303 B2 * | 2/2006 | Talwar | | B23K 20/122 228/112.1 |
| 7,204,019 B2 * | 4/2007 | Ducotey et al. | | 29/889.1 |
| 7,217,442 B2 * | 5/2007 | Wilt | | B05B 7/2497 427/385.5 |
| 7,367,122 B2 * | 5/2008 | Yip et al. | | 29/888.021 |
| 7,631,816 B2 * | 12/2009 | Jabado | | C23C 24/04 118/308 |
| 7,654,223 B2 * | 2/2010 | Kim et al. | | 118/667 |
| 7,802,350 B2 * | 9/2010 | Walker | | 29/402.13 |
| 7,958,610 B2 * | 6/2011 | Benz et al. | | 29/402.04 |
| 8,020,726 B1 * | 9/2011 | Gorenz | | G01F 11/021 222/1 |
| 8,091,227 B2 * | 1/2012 | Hong | | 29/889.1 |
| 8,187,720 B2 * | 5/2012 | Choi | | C23C 4/06 148/403 |
| 8,282,019 B2 | 10/2012 | Esfahani et al. | | |
| 8,486,249 B2 * | 7/2013 | Almond et al. | | 205/115 |
| 8,561,489 B2 * | 10/2013 | Pettitt | | B64C 3/34 73/290 V |
| 8,580,350 B2 * | 11/2013 | Choi | | C23C 4/06 427/455 |
| 8,601,663 B2 * | 12/2013 | Ngo et al. | | 29/402.18 |
| 8,675,335 B2 * | 3/2014 | Wilson | | B29C 70/443 361/218 |
| 8,783,584 B2 * | 7/2014 | Fukanuma | | C23C 24/04 239/132 |
| 2003/0037436 A1 * | 2/2003 | Ducotey et al. | | 29/889.1 |
| 2003/0217452 A1 * | 11/2003 | Talwar | | B23K 20/122 29/402.14 |
| 2003/0219542 A1 * | 11/2003 | Ewasyshyn | | C23C 24/04 427/180 |
| 2006/0045785 A1 * | 3/2006 | Hu et al. | | 419/5 |
| 2006/0134320 A1 * | 6/2006 | DeBiccari et al. | | 427/140 |
| 2009/0130327 A1 * | 5/2009 | Erdmann et al. | | 427/457 |
| 2009/0249603 A1 * | 10/2009 | Vargas | | 29/402.18 |
| 2010/0251962 A1 * | 10/2010 | Fukanuma | | C23C 24/04 118/302 |
| 2011/0168845 A1 * | 7/2011 | Pettitt et al. | | 244/135 R |
| 2011/0174536 A1 * | 7/2011 | Wilson | | B29C 70/443 174/84 S |
| 2013/0209826 A1 * | 8/2013 | Ngo et al. | | 428/558 |

OTHER PUBLICATIONS

EP 2261057 EPO English Translation; Pages et al.; Method for making and protecting the metal plating of aeronautical structures and subassemblies; Dec. 1, 2016; pp. 1-5.*

Irissou, Eric et al., "Review on Cold Spray Process and Technology: Part I—Intellectual Property", Journal of Thermal Spray Technology, vol. 17(4), pp. 495-516 Dec. 31, 2008.

* cited by examiner

METHODS FOR COLD SPRAY REPAIR

CROSS-REFERENCE TO RELATED APPLICATIONS

This application claims priority under 35 U.S.C. § 119 to the following provisional applications: Ser. No. 61/719,636 filed Oct. 29, 2012; Ser. No. 61/719,641 filed Oct. 29, 2012; and Ser. No. 61/719,632 filed Oct. 29, 2012, which are incorporated by reference in their entirety.

BACKGROUND OF THE INVENTION

I. Field of the Invention

The present invention relates to cold spray repair. More specifically, but not exclusively, the present invention relates to methods for cold spray repairing aircraft panels and hydraulic lines.

II. Description of the Prior Art

Wear and degradation of components and parts over time in machines, devices and systems is a problem. The costs associated with repair and reclamation is a major factor that drives research to identify cheaper solutions. Another significant consideration is the cost of replacement versus the costs of repair and reclamation. These considerations and factors can be disabling in the case where such components or parts have to be removed from operation for repair and reclamation.

Therefore, it is an object, feature or advantage of the present invention to provide a repair and reclamation solution that is capable of returning a component or part to its full form, fit and function without having to remove the part or component from operation.

Most components and parts used in machines, devices and systems are required to meet certain design, operation and performance specifications. Oversight entities often approve or disapprove of various types of repairs and reclamation attempts for these various components and parts.

Therefore, it is another object, feature or advantage of the present invention to provide cold spray methods that make parts and components whole again where the resultant fix returns the part to its full form, fit and function (akin to an OEM part) that meets all of the design, performance and operational requirements of any overseeing entity.

What follows are two specific examples of cold spray repair and reclamation for components and parts in machines, devices and systems.

a. Aircraft Skin Panels

A common problem with aircraft skin panels is that over time the removable fastener holes wear from constant removal and reinstallation of the fasteners. Additionally, misalignment of the holes in the skin with respect to the locations of the fastener holes in the aircraft frame, caused by initial mis-machining or slight movement and shifting of the aircraft frame over time, can cause additional elongation, widening and wear to the fastener holes. As a result, the fasteners begin to burrow below the surface of the skin panel. This is particularly problematic since this causes turbulent airflow over the fasteners, which in turn causes vibration and chaffing of the fastener against the skin panel and consequently further exacerbates the wear around the fastener. Eventually, the fastener holes become so worn that the fasteners can either pull through the skin, or loosen and vibrate out in service.

The chaffing between the panels and their fasteners can also cause movement and chaffing of one panel edge against another. This wear and chaffing then results in parts that are out of tolerance. Chaffing is most commonly pronounced at chamfered screw/rivet fastener holes. In many aircraft, flathead (steel) Tridair™ fasteners (which pass through chamfered holes, and have tops that are flush with the panel surface) are used to secure the panel. These panels are constantly opened for inspection of the aircraft, causing wear to the fastener holes from removal and reinstallation of the fastener. Furthermore, due to the effects of normal aircraft vibration, the panels vibrate against the Tridair™ fasteners, causing chaffing. As a result, the edges of the holes eventually wear, thereby loosening the connection between the panel and the fastener (thus resulting in potential movement and even loss of the panel or individual fasteners retaining the panel). Such wear and panel movements cause the airflow over the fastener holes and panel to become turbulent, further exacerbating the wear and vibration. Currently, no qualified (i.e. oversight entity approved) permanent repair procedures exist for repairing damaged fastener holes. Instead, the worn aircraft panel is simply replaced. In the case of military aircraft, this sort of replacement is very expensive. For example, a simple replacement panel on the Forward Equipment Bay of a USAF B-1 bomber can cost in excess of $200,000.

Therefore, a further object, feature, or advantage of the present invention is to provide cold spray methods for repairing worn fastener holes on aircraft skin panels, instead of replacing the entire panel.

A still further object, feature or advantage of the present invention is to provide a solution to this problem that repairs and reclaims the aircraft panel to its full form, fit and function (akin to the OEM part).

b. Aircraft Hydraulic Lines

Aircraft hydraulic lines tend to wear over time at contact points. This is especially true at locations along the hydraulic lines where the lines are secured by clamps or rub against other components or structures. At these points or location, the normal vibration of the aircraft causes chaffing of the hydraulic line (as the hydraulic line vibrates against an object).

Current solutions to this problem include the (low-tech) approach of simply wrapping the lines with a "chafe wrap". Other solutions include using a sleeve that is placed around the line over the area of concern. Unfortunately, these sorts of wrapping and sleeving treatments do not stand up over time since the wrap and sleeve themselves wear down over time. In addition, the wrapping and sleeving approaches do not maintain a good surface bond between the hydraulic tubing and the chaff prevention material (i.e. the wrap or sleeve). Therefore, the chaffing prevention material applied eventually only chaffs the tubing material even more. Also, these types of repair and reclamation techniques are not effective for use at the end of a hydraulic tubing. The sleeving repair and reclamation technique requires that the tubing be removed from operation thus resulting in down time in the aircraft. Taken together, these impediments represent a huge disadvantage, cost and hurdle to overcome.

Therefore, it is an object, feature, or advantage of the present invention to provide cold spray methods for repairing and reclaiming aircraft hydraulic lines by repairing the line to its full form, fit and function (akin to an OEM hydraulic line).

A still further object, feature, or advantage of the present is to provide cold spray methods for repairing and reclaiming hydraulic lines that can be performed in situ while the line is still in operation.

SUMMARY OF THE INVENTION

One embodiment provides a method for cold spraying aircraft panels. A fastener hole in an aircraft panel in need of repair is identified. The location of the fastener hole is captured. Cold spray materials are deposited about the fastener hole for reclaiming the aircraft panel. Any excess cold spray material may be removed. In a preferred aspect, the fastener hole is a chamfered fastener hole in an aircraft external access panel.

Another embodiment provides a method for cold spraying hydraulic lines. A surface of a hydraulic line in need of repair is identified. A cold spray nozzle is aimed at the surface of a hydraulic line. Cold spray materials are deposited onto the surface of the hydraulic line. Any excess cold spray material may be removed. In a preferred aspect, the hydraulic lines are aircraft hydraulic lines.

Yet another embodiment provides a cold spray repair method. By taking a gas and a powder and combining the gas and powder, a gas-powdered mixture is created. The gas-powder mixture is communicated to a spray gun. The gas-powder mixture is discharged from the spray gun onto the surface of the repair part for making a repair. In a preferred aspect, the aircraft component is repaired in situ while still connected to the aircraft.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE PREFERRED EMBODIMENTS

Figure 1:
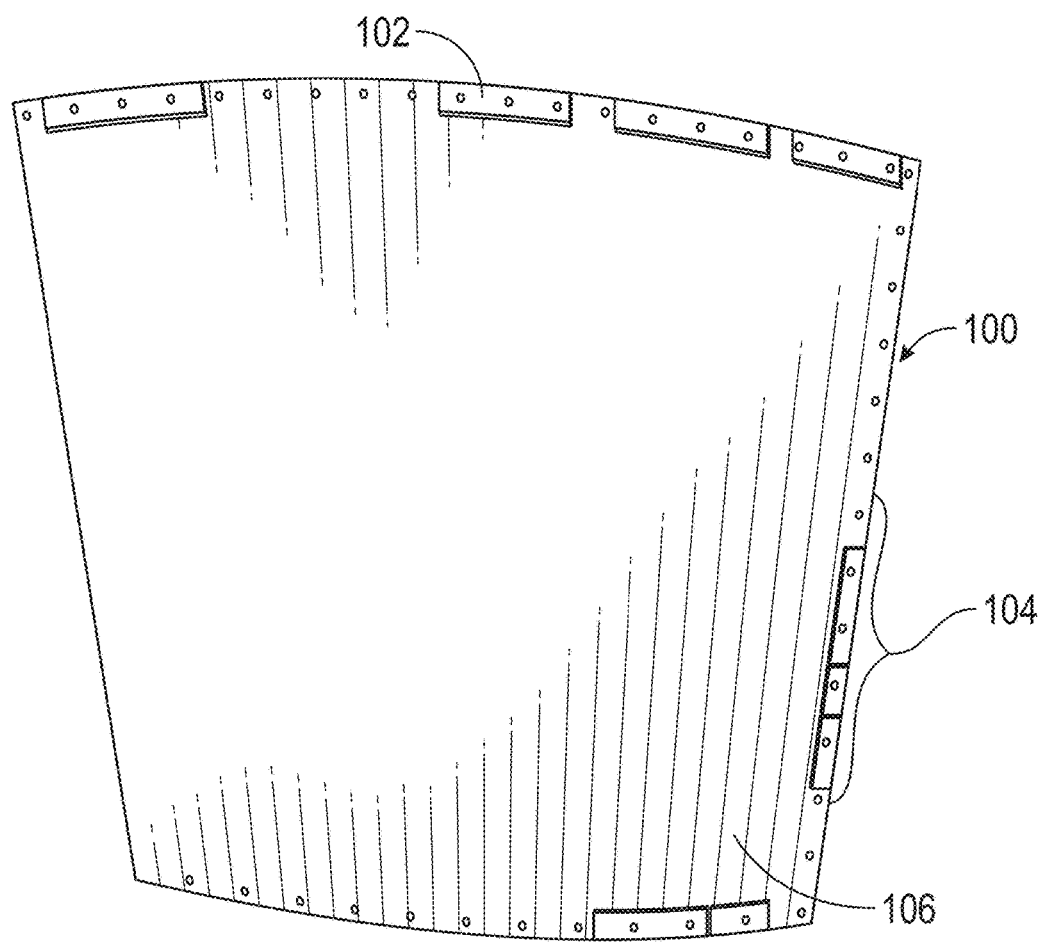
FIG. 1 is a pictorial representation of an aircraft skin panel in need of repair, showing the fastener holes around its perimeter in accordance with an illustrative embodiment.
Figure 3:
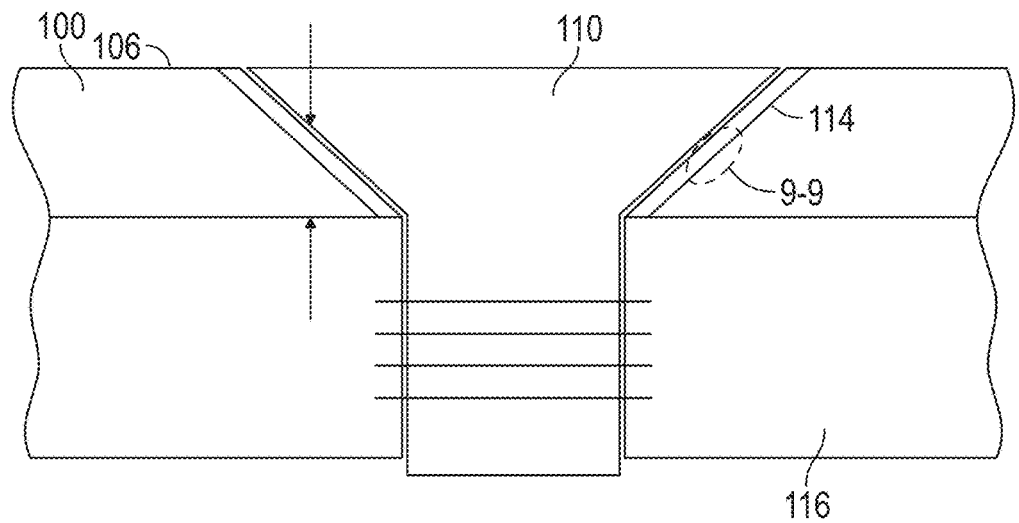
FIG. 3 is a pictorial illustration of a sectional view taken along line 3-3 in FIG. 8 according to an illustrative embodiment.

The illustrative embodiments provide methods for cold spray repair of one or more component parts. Specifically, the illustrative embodiments provide cold spray repair methods for aluminum aircraft skin fastener holes and hydraulic tubing. FIG. 1 provides a pictorial illustration of an aircraft panel, and more specifically an aluminum aircraft external access panel, such as the type that are typically secured to the airframe of an aircraft using steel fasteners, such as Tridair™ fasteners. The aircraft panel 100 is typically fabricated from aluminum (e.g., 2024-T6 aluminum), however other materials may be used where appropriate for use on an aircraft as best shown in FIG. 3. The aircraft panel 100 includes an outer perimeter 102 with a plurality of fastener holes 104. In the case where the aircraft panel 100 is an outer skin or external access panel of an aircraft, the plurality of fastener holes 104 are generally secured to the airframe of the aircraft. The aircraft panel 100 is often removed for gaining access to the aircraft for performing maintenance operations or the like. The aircraft panel 100 includes an outer surface 106 and an inner surface opposite the outer surface (not shown). In the case where the aircraft panel 100 is an integrally stiffened bonded panel, the inner surface (not shown) includes a composite material substrate (not shown). The panel 100 and the composite are fabricated as a single component, thus techniques for repair and reclamation of the aircraft panel 100 must take into consideration the presence of a composite material substrate on the inner surface of the aircraft panel 100.

Figure 2A:
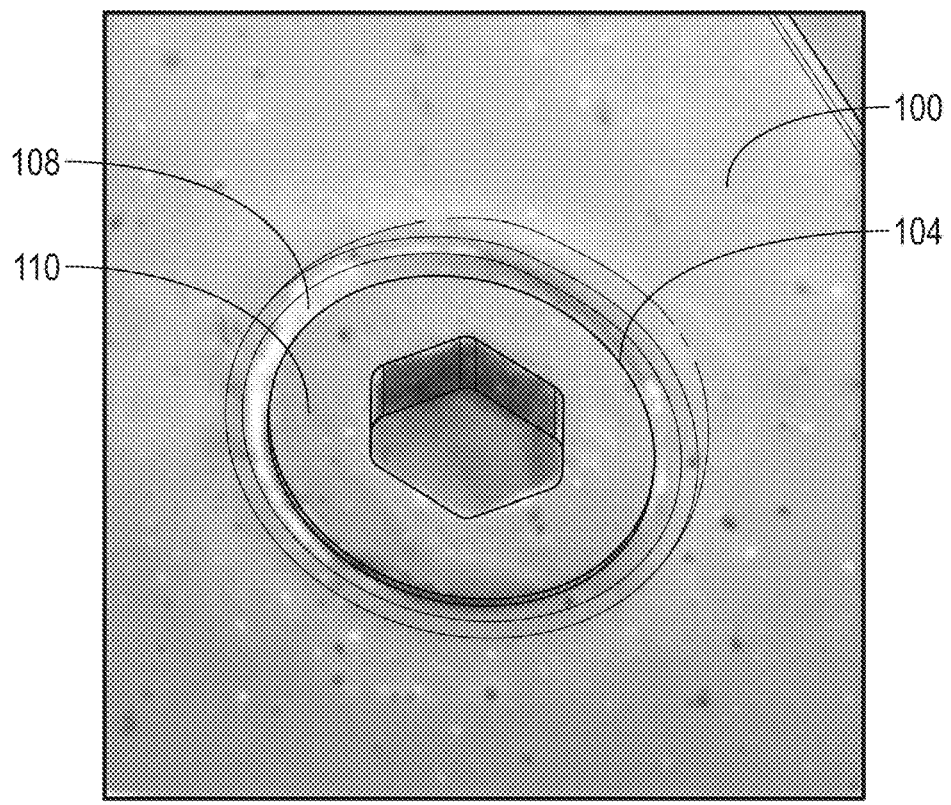
FIG. 2A is a pictorial representation of a fastener in a fastener hole in accordance with an illustrative embodiment.

FIG. 2A provides a pictorial representation of identified wear in a fastener hole 104 in the aircraft panel 100. As illustrated, the fastener hole 104 in the aircraft panel 100 has a chamfer 108 around the fastener hole 104 through which a fastener 110 is received for securing the panel 100 to the airframe of the aircraft. The fastener 110 is designed to sit flush with the panel 100 to enable laminar airflow over the head of the fastener 110. Repeated access to the panel 100 wears and enlarges the fastener hole 104 and the chamfer 108. As wear increases, the fastener 110 sits further and further below the surface of the aircraft panel 100, resulting in turbulent airflow, vibration of the panel 100 and eventually pull through and loss of the fastener in flight.

Figure 2B:
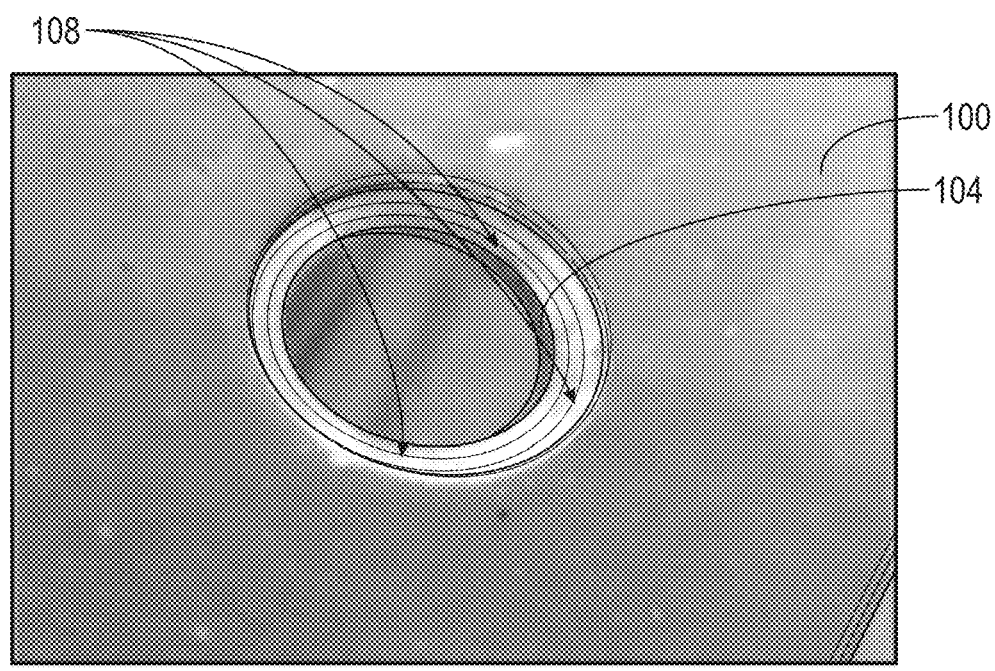
FIG. 2B is a pictorial representation of a worn fastener hole in an aircraft panel according to an illustrative embodiment.

FIG. 2B provides a pictorial representation of the wear occurring at the fastener hole 104 and chamfer 108 on the aircraft panel 100. Note specifically the chaffing wear around the fastener hole 104 in the chamfer 108 portion. The damage to the fastener hole 104 and chamfer 108 caused by chaffing results in many of the aforementioned problems. In the example of an aircraft panel 100, the cost for replacing the panel in the case where such wear is identified can be exorbitant and almost prohibitive to maintain operation of the aircraft. Therefore, a cold spray repair method that returns the fastener hole 104 back to its original and full form, fit and function (akin to an OEM part) is desired. The repair and reclamation of an aircraft panel is far less expensive than the replacement cost of replacing an entire panel in the event such damage occurs.

Figure 4:
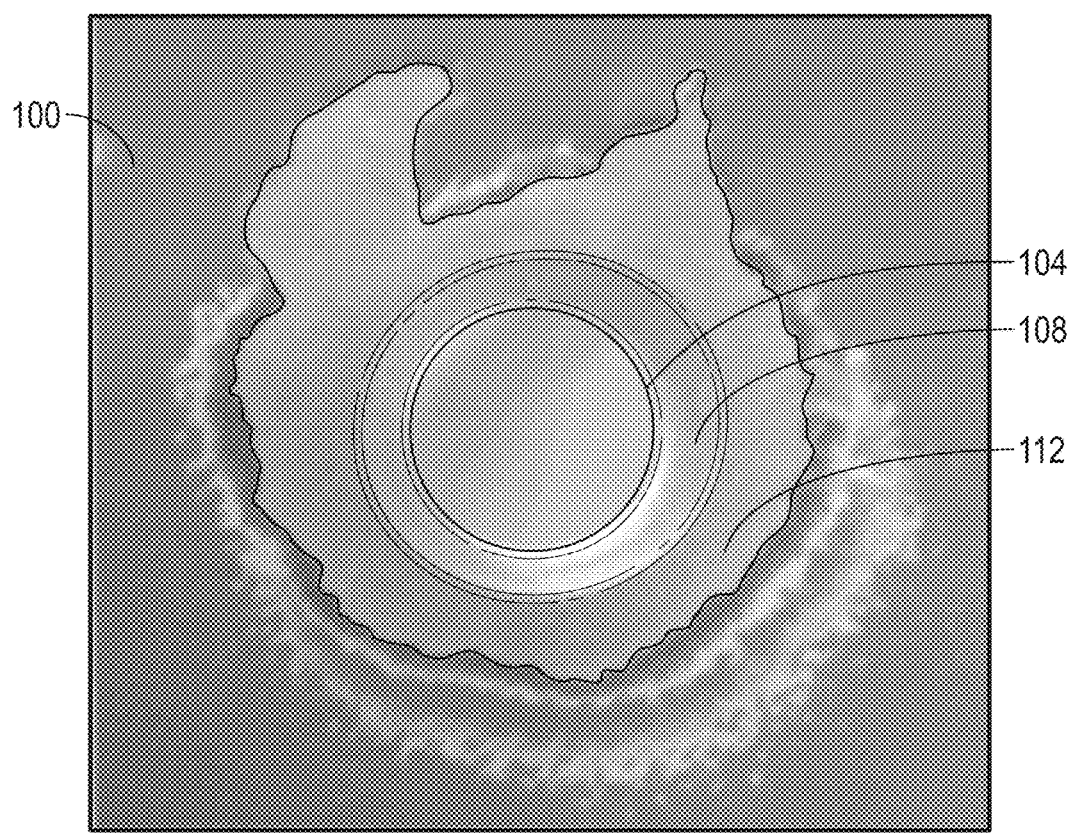
FIG. 4 is a pictorial representation of a fastener hole in an aircraft panel prepped for cold spray application in accordance with an illustrative embodiment.

According to an embodiment of the invention, a fastener hole 104 in need of repair may undergo one or more of the following operations to fully repair and reclaim the fastener hole and aircraft panel using cold spray repair methods of the present invention. FIG. 4 provides a pictorial illustration of an aircraft panel 100 where the fastener hole 104 and chamfer 108 and material of the panel 100 about the chamfer 108 is cleaned and prepped prior to cold spray deposition. One method of cleaning and prepping includes grit blasting the fastener hole 104, chamfer 108 and surrounding portion 112 to remove paint from the area and to enhance bonding to the surface. According to an exemplary aspect, using grit blasting, paint and other adhesion impediments are removed using $AL_2O_3$ grit blasting which includes, for example, a combination of grit blast (80 grit $AL_2O_3$), compressed air, and 6061 aluminum powder. Other methods and materials for prepping, cleaning or otherwise providing optimal surface adhesion properties are contemplated. At some point in the process before cold spray deposition, the plurality of fastener holes 104 or the implicated fastener holes in an aircraft panel 100 may be templated to identify the position and/or centers of each of the fastener holes for subsequent repair and reclamation. Templates, for example, may be created from Mylar to record the position and center location of the fastener holes prior to performing cold spray deposition, repair and reclamation.

Figure 5:
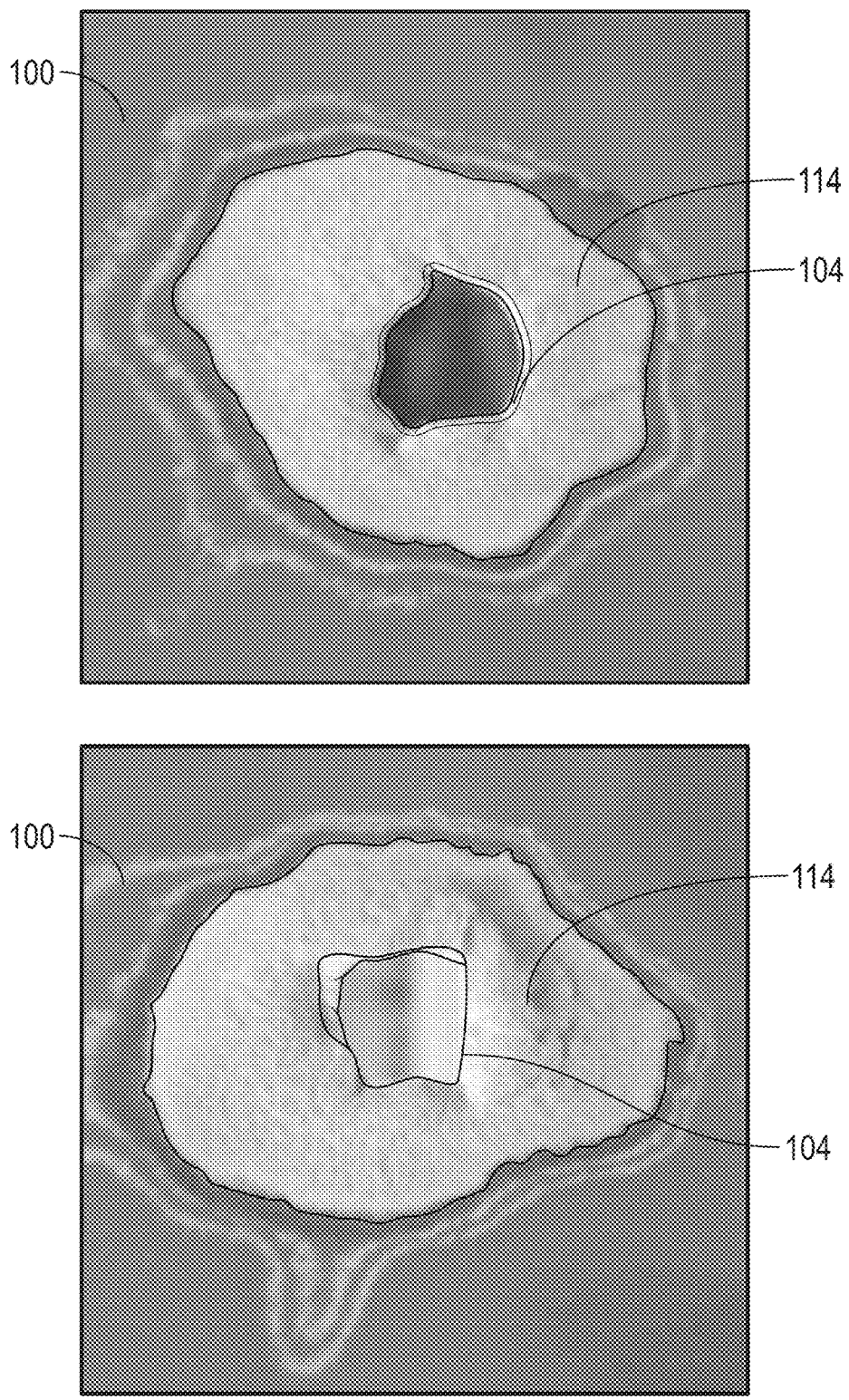
FIG. 5 is a pictorial representation of a pair of fastener holes in an aircraft panel with deposited cold spray materials in accordance with an illustrative embodiment.
Figure 14A:
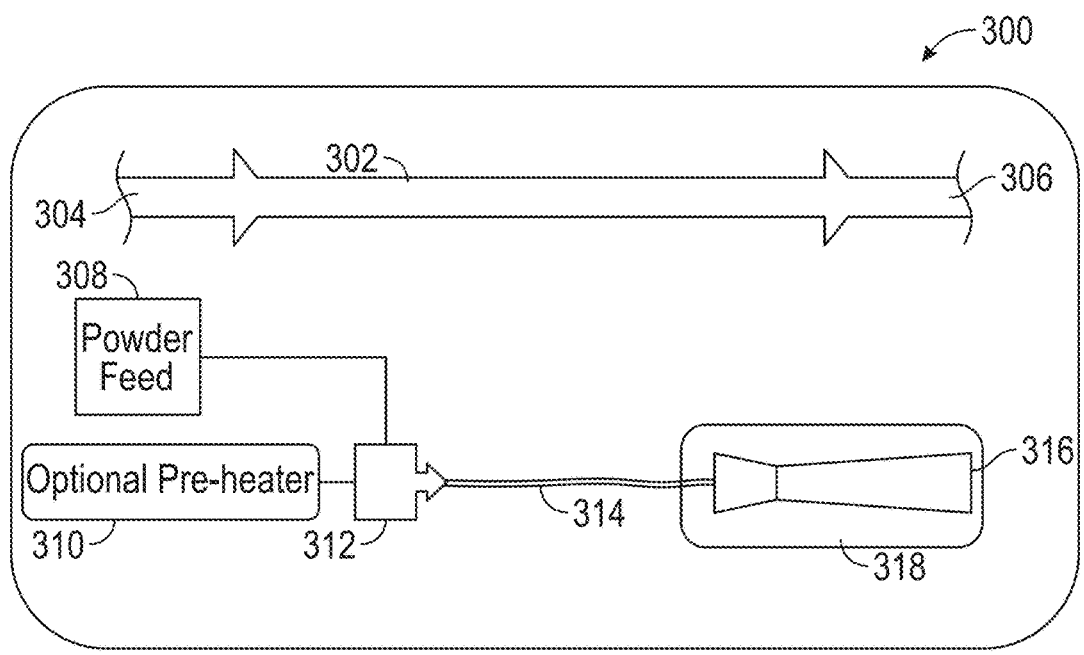
FIG. 14A is a pictorial representation of a cold spray repair method in accordance with an illustrative embodiment.
Figure 14B:
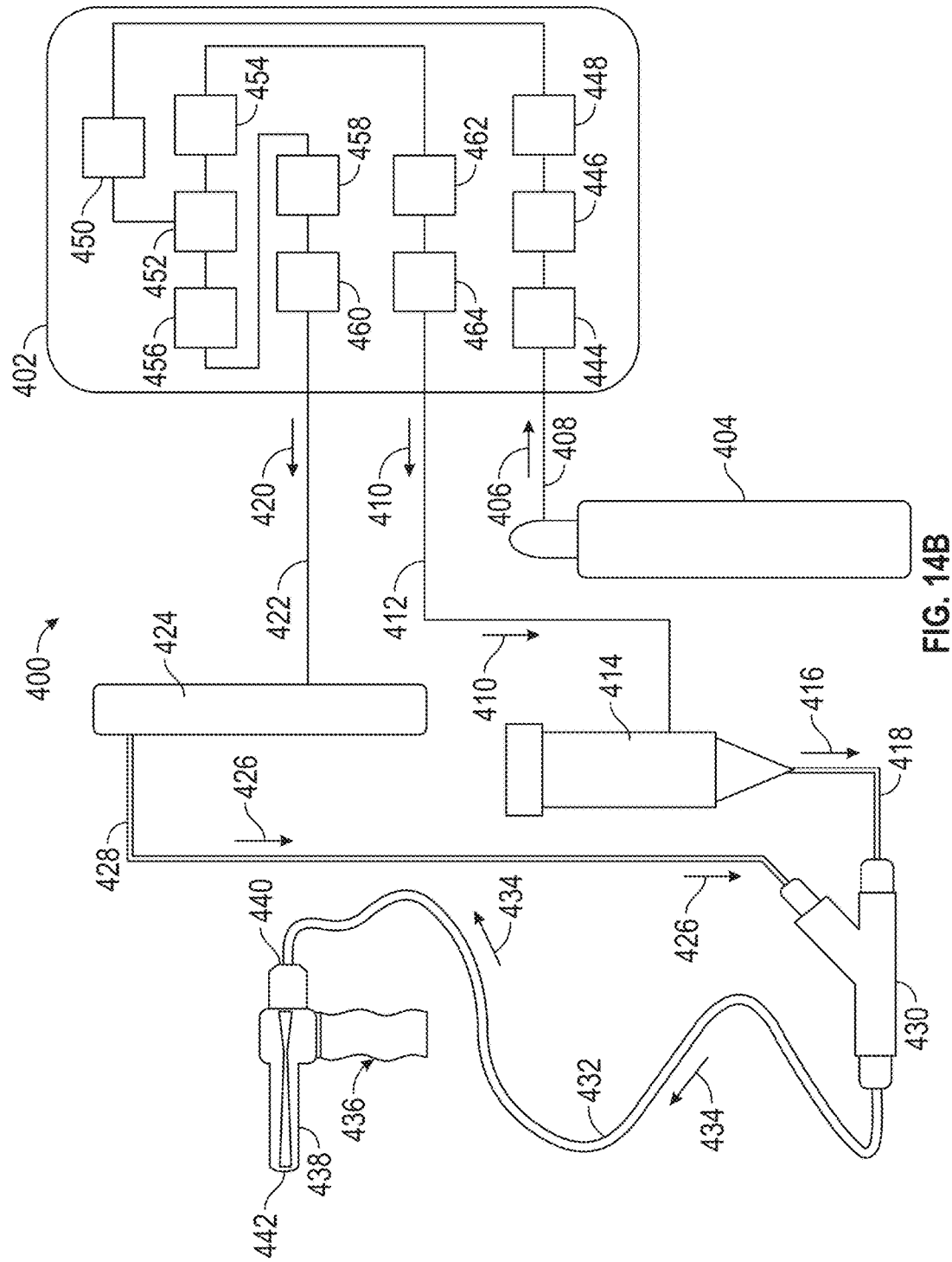
FIG. 14B is another pictorial representation of a cold spray repair method in accordance with an illustrative embodiment.

Methods for cold spray repair may use any one of the cold spray methods illustrated in FIGS. 14A and 14B, as described in application Ser. No. 14/066,346 entitled, "COLD SPRAY DEVICE AND SYSTEM", filed on the same date as the present application, and incorporated herein in its entirety by reference. The methods pictorially represented in FIGS. 14A-14B describe cold spray methods that are advantageously applied by a highly mobile, highly maneuverable, cold spray nozzle that mixes a gas-powder mixture upstream of the nozzle for providing cold spray deposition. Using the methods illustrated in FIGS. 14A-14B, a cold spray repair and reclamation of the fastener hole 104 illustrated in the pair of photos shown in FIG. 5 is accomplished. Specifically, cold spray material 114 is applied about the fastener hole 104 to the aircraft panel 100 as shown and illustrated. Cold spray material 114 can be applied by hand or by automation using the methods shown and illustrated in FIGS. 14A-14B. For example, in the case where the aircraft panel 100 is 2024-T6 aluminum, cold spray material 114 may comprise A0027 powder and compressed nitrogen at 350 PSI and 350° C. The cold spray material 114 may be applied using the methods shown and illustrated in FIGS. 14A-14B using, for example, a tungsten carbide nozzle on the spray nozzle assembly. Embodiments of the invention contemplate performing the repair and reclamation of a fastener hole in an aircraft panel in situ or with the panel removed from operation for a short window of time.

Figure 6:
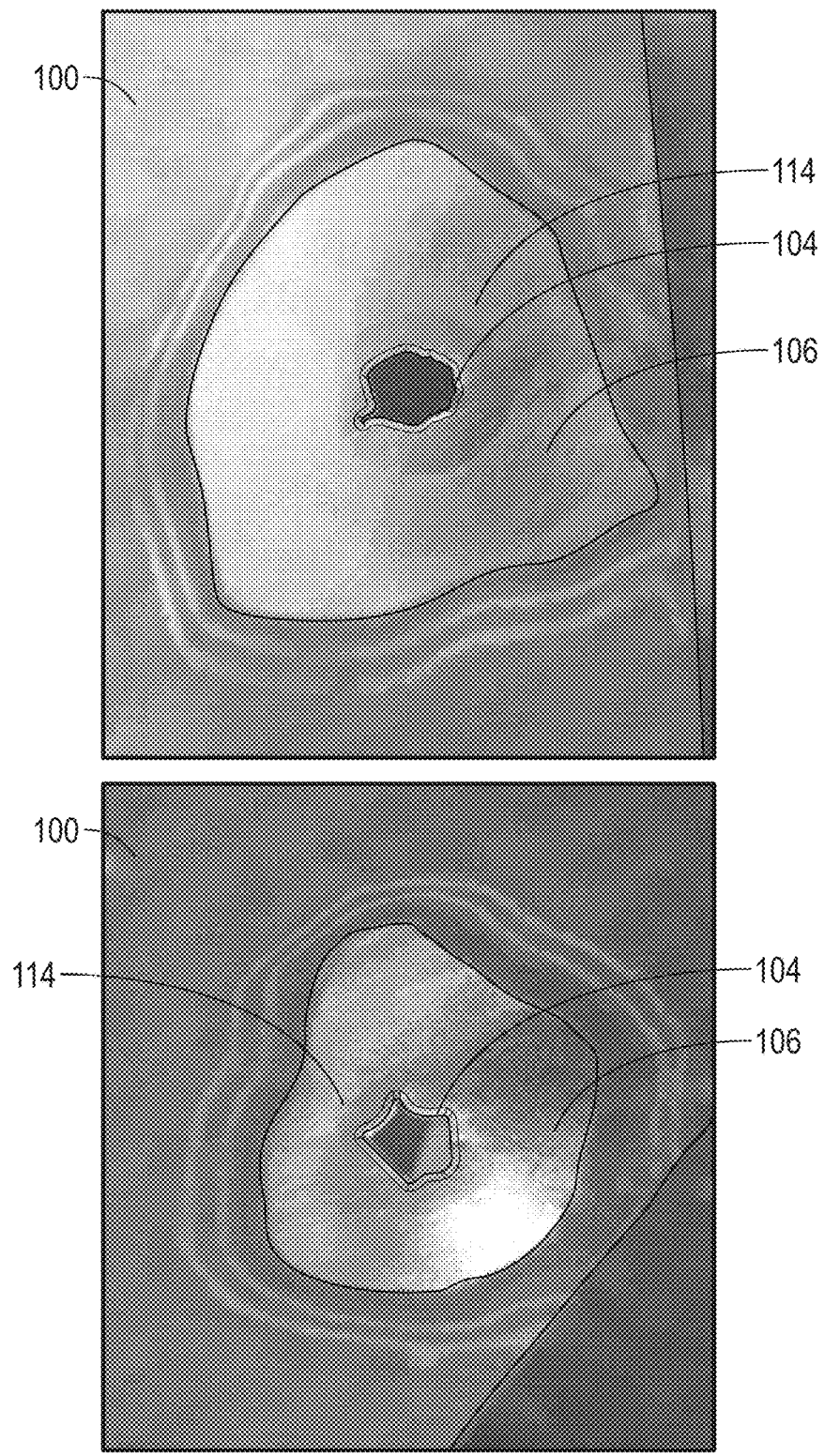
FIG. 6 is a pictorial representation of a pair of fastener holes in an aircraft panel with excess cold spray material removed in accordance with an illustrative embodiment.

FIG. 6 provides pictorial illustrations of a pair of photos for fastener holes 104 after the cold spray material 114 has been removed so as to be flush with the outer surface 106 of the aircraft panel 100. Removal of excess cold spray material 114 may be accomplished by grinding followed subsequently by polishing. The removal of excess cold spray material 114 provides a flush surface ensuring that the cold spray material is only on the interior of the fastener hole 104, and not on the top outer surface 106 of the aircraft panel 100 (i.e., such that it does not increase the thickness of the aircraft panel 100 itself). Exemplary methods for removing cold spray material 114 from the surface of the aircraft panel 100 include, for example, grinding/polishing with a fine Scotch-Brite disk.

Figure 7:
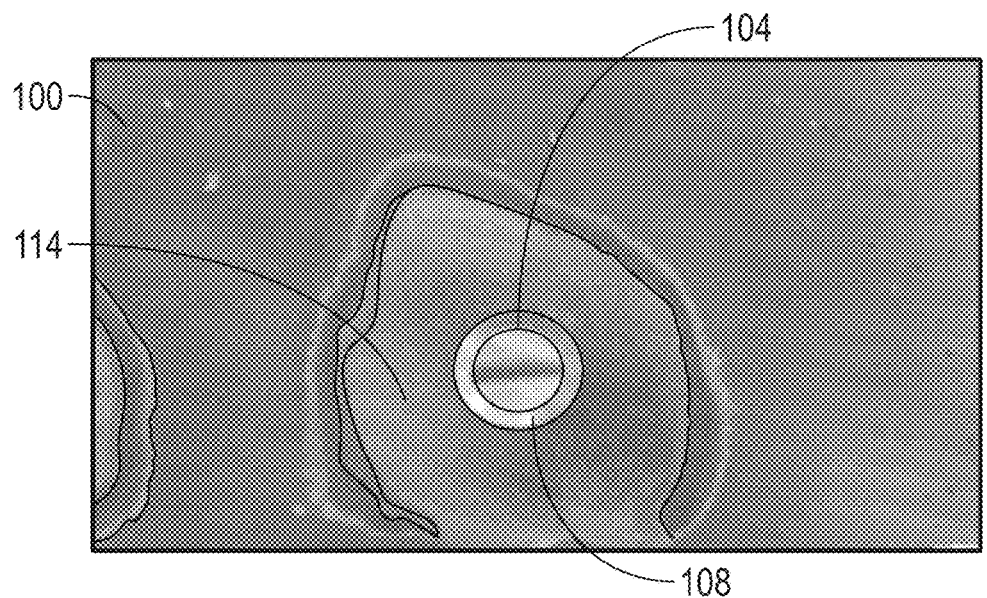
FIG. 7 is a pictorial representation of a fastener hole in an aircraft panel with a chamfer recut in the cold spray deposition in accordance with an illustrative embodiment.

Using, for example, the template created to identify the fastener 104 location and centers, machining may be performed using, for example, a micro-stop tool, to cut the chamfer 108 back into the fastener hole 104. The chamfer 108 is cut by removing portions of the cold spray material 114 and recreating the desired taper or angle of the chamfer surface 108 relative to the fastener hole 104 and outer surface 106 of the aircraft panel 100. FIG. 7 provides a pictorial illustration of a machined chamfer 108 about the fastener hole 104 where cold spray material 114 is removed by the machine to create the chamfer 108. The fastener hole 104 may be located, positioned and centered using one or more of the aforementioned templates or described methods. Specifically, the chamfer 108 is designed to mirror the tamper on the head of a fastener, such as a Tridair™ fastener.

Figure 8:
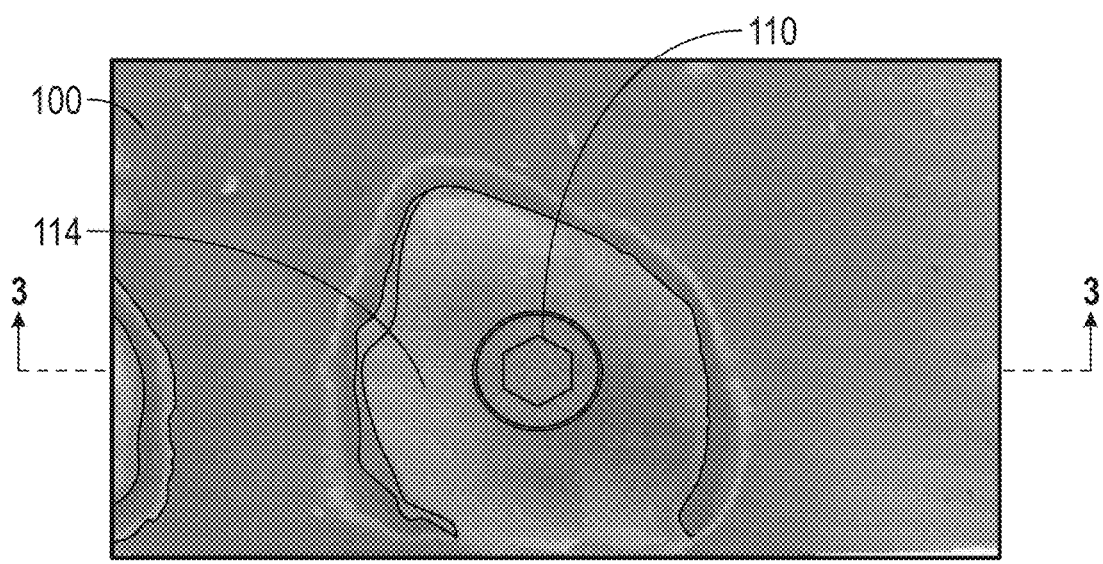
FIG. 8 is a pictorial representation of the fastener hole illustrated in FIG. 7 with a new fastener inserted therethrough in accordance with an illustrative embodiment.

FIG. 8 provides a pictorial illustration of a new fastener 110 inserted into the fastener hole 104 of the aircraft panel 100. Thus, after the chamfer 108 has been prepared as illustrated in FIG. 7 and new fastener 110 (e.g., a new Tridium™ rivet or Tridair™ fastener) may be inserted therethrough as illustrated in FIG. 8. FIG. 3 provides a pictorial illustration of a sectional view taken along line 3-3 in FIG. 8. As can be seen in FIG. 3, the top of the fastener 110 now sits flush with the outer surface 106 of the aircraft panel 100 to enable laminar airflow over the fastener head in the aircraft panel. The cold spray material 114 creates the chamfer 108 in contact with the head of the fastener 110. The cold spray material 114 within the chamfered region is generally under compression (as shown by the two opposing arrows). Thus, it will transfer the panel loads to the fastener just as effective as was previously done (when the panel was new) without the cold spray layer or if a new OEM aircraft panel were purchased and used. FIG. 3 also illustrates how the aircraft panel 100 is secured to the aircraft frame 116 using fastener 110.

Figure 9:
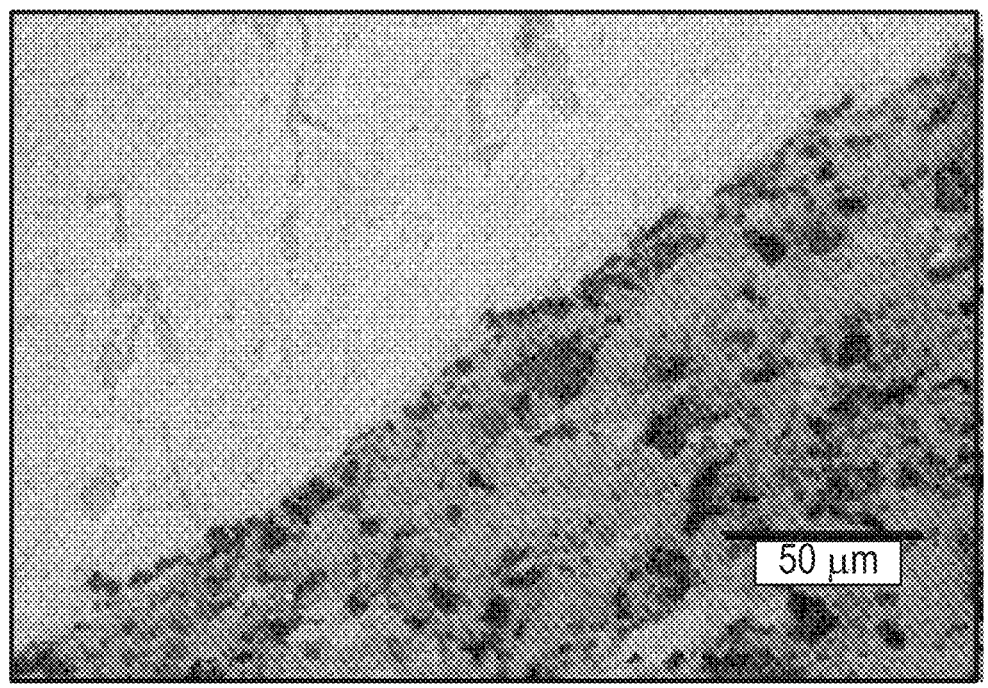
FIG. 9 provides a pictorial illustration of a photo of the interface between the cold spray material and the aircraft panel taken along line 9-9 in FIG. 3.

FIG. 9 is a pictorial illustration of a cold spray interface metallography taken along line 9-9 in FIG. 3.

Experimental Results

Embodiments of the present invention can be applied specifically to a USAF B-1 bomber Forward Equipment Bay skin panel. The panel may be made from 2024-T6 aluminum. The cold spray used may be A0027 powder and compressed nitrogen at 350 psi and 350° C. After cold spray repair and reclamation, the aircraft panel 100 may be tested for adhesion, bearing load, shear force, fatigue and metallography. Regarding bearing load, experimental results of the present invention show cold spray material failure up to full bearing load (i.e., the cold spray material did not separate from the panel at a load of 5600 lbs.). Regarding shear load, a shear strength of greater than 4,000 psi was accomplished using methods of repair and reclamation of the present invention. Regarding fatigue, a 15 ksi tensile strength (which is approximately the same as the upper end for the aircraft skin loads) was used; the panel lasted approximately 500,000 cycles. Metallography microscopic results showed a dense coating with an adequate interface (see FIG. 9) between the base panel material and cold spray material. In addition, the temperature on the backside of the panel was monitored during the entire cold spray and reclamation process. The maximum temperature measured was less than 153° F. As a result, no detrimental effect was shown on the 2024 aluminum material or composite material substrate.

Cold Spray Repair of Hydraulic Tubing

In a cold spray method shown in FIGS. 14A-14B, described in application Ser. No. 14/066,346 entitled "COLD SPRAY DEVICE AND SYSTEM", filed on the same date as the present application, and incorporated herein in its entirety by reference, provide specially engineered methods whereby sub-micron and micron size solid state particles are accelerated to supersonic speeds through a convergent-divergent nozzle using, such accelerants as helium, nitrogen or compressed air. When the particles impact the surface, the particles form a strong mechanical and metallurgical bond.

Embodiments of the present invention leverage cold spray methods illustrated in FIGS. 14A-14B to extend the life of hydraulic lines for aircraft and locations where chaffing is known to occur. Thus, cold spray repair and reclamation can be an important part of a preventative maintenance program for aircraft hydraulic lines. In one aspect, cold spray materials applied as an additional layer of material (e.g., titanium material) to the region of the hydraulic line that is prone to chaffing. By applying the additional layer, the chaffing occurs first in the cold spray material, and not in the structural wall of the hydraulic line. As a result, the time that it takes to chaff into the hydraulic line is greatly extended, thereby extending the life the hydraulic tubing. Thus, this reduces the maintenance hours required to maintain the aircraft in serviceable condition. As a result, these hydraulic lines need only be replaced during scheduled maintenance and do not require the parts to be taken out of service and thus the aircraft out of service. The repair also returns the draft point and line back to its fully fit, form and function.

Embodiments of the present invention provide cold spray repair and reclamation methods that extend the life of hydraulic tubing, offering advantages over other existing approaches. Specifically, aspects of the present invention contain the principle advantage over both welding and plain spray techniques in that cold spray can create strong metallurgical bonds with the hydraulic line substrate without damaging the substrate material or surrounding components, surfaces or the like.

Other advantages and aspects of cold spray repair and reclamation methods of the present invention include cold spraying hydraulic lines that are already bent into the final shape prior to cold spray being applied. The application of the cold spray does not change the final shape or orientation of the tube, to the effect that the tube can either be coated in-place (i.e., in situ) or coated after removal and then immediately reinstalled. Other advantages and aspects of the present invention include cold spraying hydraulic lines to increase the thickness only at the locations where they contact another surface, such as a clamp, bulkhead or other like object. As a result, another aspect of the present invention is that a narrower thickness hydraulic line tubing can be used in the first place (with the added width being only at the cold spray locations). Moreover, by using comparatively narrow tubing in the first place, this has the advantage that the tubing is easier to be bent into its final orientation prior to installation, and can reduce the total weight of the line in the aircraft. Other benefits include the fact that cold spray repair and reclamation of hydraulic tubing does not affect the interior wall dimensions or volume of the tubing.

Specific applications of cold spray repair and reclamation of components include successful repair and reclamation of hydraulic landing gear and wing spoiler actuator lines of a USAF B-1 bomber. Specifically, a coating (e.g., titanium coating) may be applied to hydraulic lines (e.g., titanium hydraulic lines). Results successfully show adequate deposition, efficiency, bond strength, density and hardness.

Experimental Results

Figure 11:
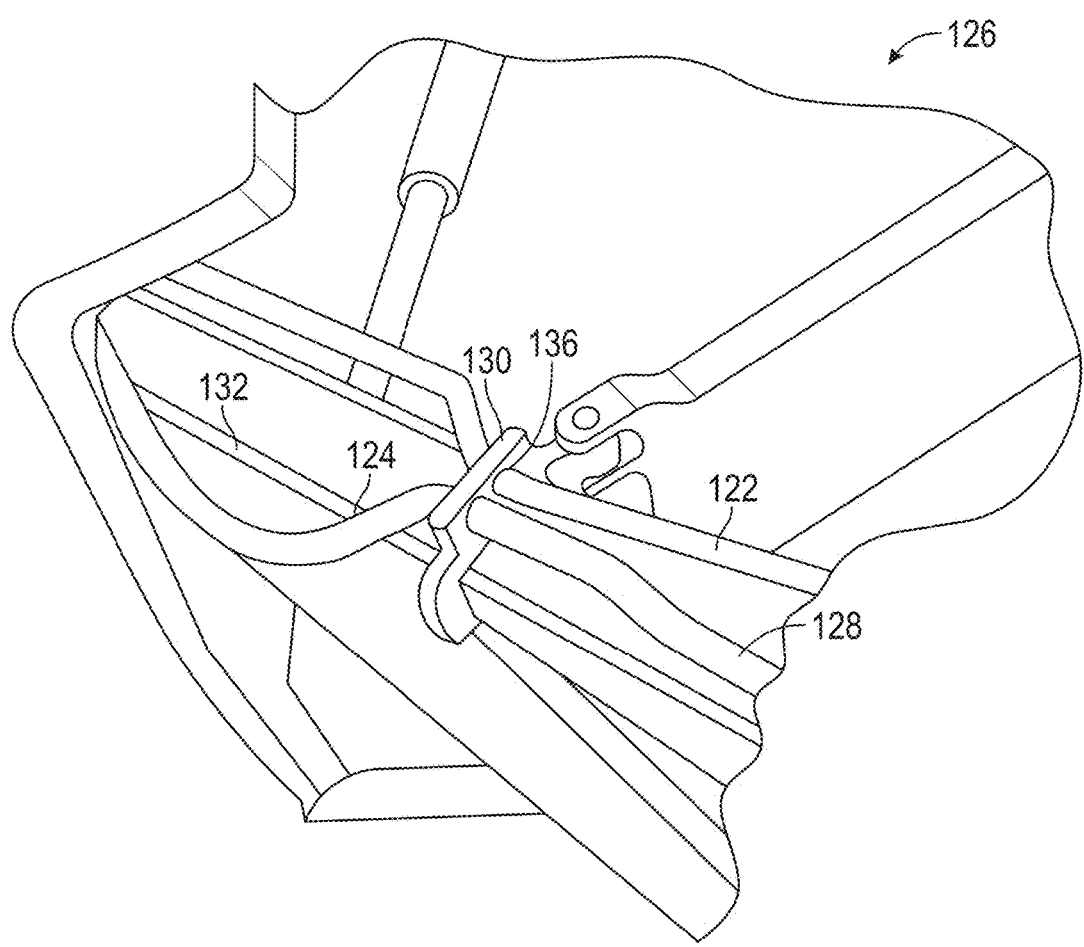
FIG. 11 is a pictorial representation of a hydraulic line and chaff points or locations in a USAF B-1 landing gear assembly in accordance with an illustrative embodiment.
Figure 12:
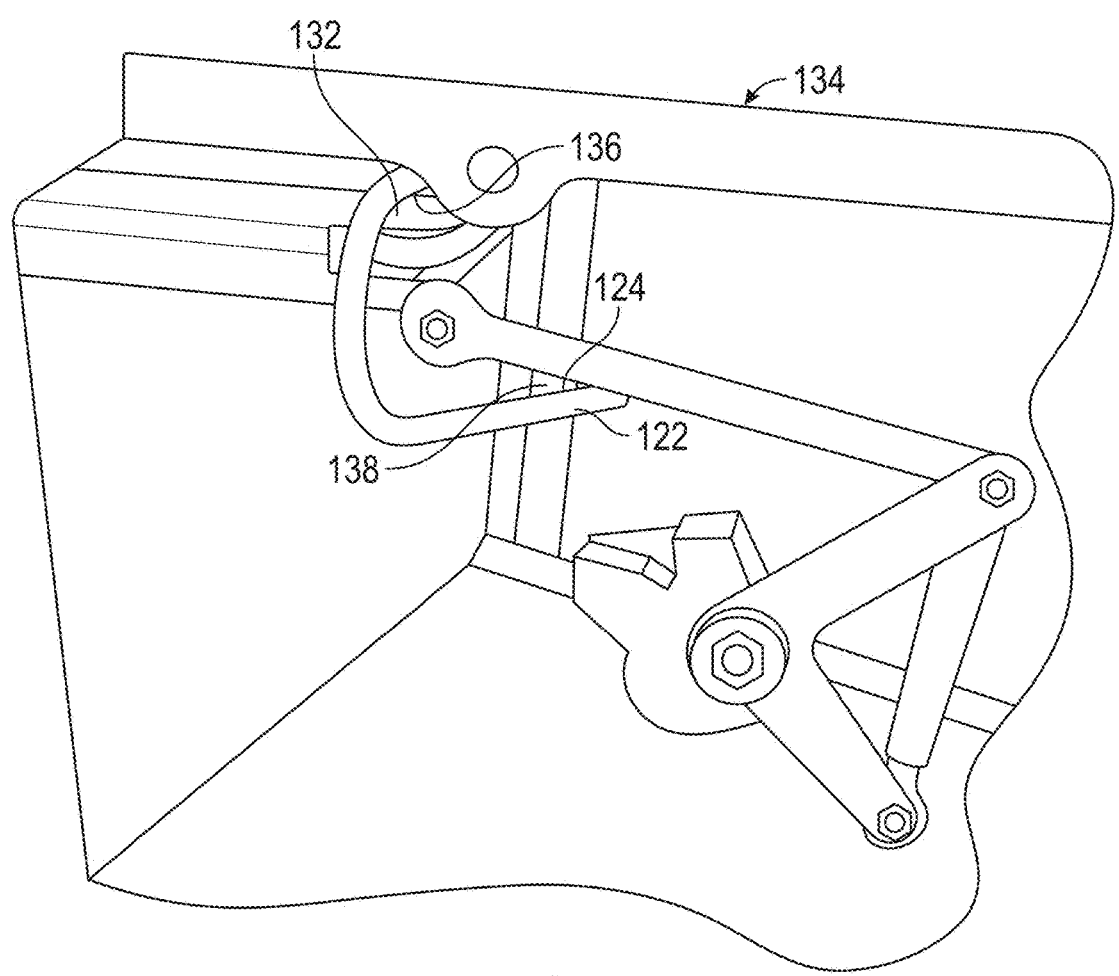
FIG. 12 is a pictorial representation of a hydraulic line showing chaff points in a USAF B-1 spoiler hydraulic assembly in accordance with an illustrative embodiment.

FIGS. 11-12 provide pictorial illustrations of specific locations aboard an aircraft where hydraulic line is located and prone or subject to chaffing, wear or other like degradation effects. Specifically, FIG. 11 provides a pictorial illustration of hydraulic line 122 and 128 housed within landing gear assembly 126, such as landing gear assembly of a USAF B-1 bomber. FIG. 12 provides a pictorial illustration of hydraulic tubing 122 housed within a spoiler assembly 134, such as a spoiler assembly in a USAF B-1 bomber. In each instance, the hydraulic lines are exposed to, prone to, or otherwise subject to rubbing, chaffing or like degradation effects. In the landing gear assembly 126 shown in FIG. 11, hydraulic line 122 and 128 passes through a bracket 130 and overtop the surface 132 of a member of the landing gear assembly 126. A chaffing point 124, 136 results as the hydraulic tubing 122, 128 passes through, adjacent to, by, over top of, around, or otherwise in contact with another surface, such as surface 132. For example, hydraulic line 122, 128 passes through bracket 130. Where the hydraulic line touches the bracket 130, a chaffing point 136 exists. Similarly, where hydraulic line 128 passes over the surface 132 of a component of the landing gear assembly 126, a chaffing point 124 exists. Chaffing points may exist along a hydraulic line at any location where the hydraulic line touches another surface. Vibration, movement and interaction between the surface and other degradative elements cause the hydraulic line to wear over time. An inordinate amount of wear occurs specifically at these chaff points, such as chaff points 124, 136 illustrated in FIG. 11. FIG. 12 provides another pictorial illustration for an assembly aboard an aircraft, such as a spoiler assembly 134 in a USAF B-1 bomber. As with the landing gear assembly 126, the spoiler assembly 134 includes a hydraulic line 122 that passes through the spoiler assembly 134. The hydraulic line 122 comes into contact with surfaces in the spoiler assembly 134, for example surface 138 where a chaffing point 124 exists. The hydraulic line 122 may also come into contact with other surfaces, such as surface 132 where another chaff point 136 exists. These are exhibited only for the purpose of illustration, and to provide examples of where hydraulic lines within an aircraft are exposed to possible chaffing points. In this instance, the hydraulic line 122 experiences wear at the chaff points 124, 136.

Figure 10A:
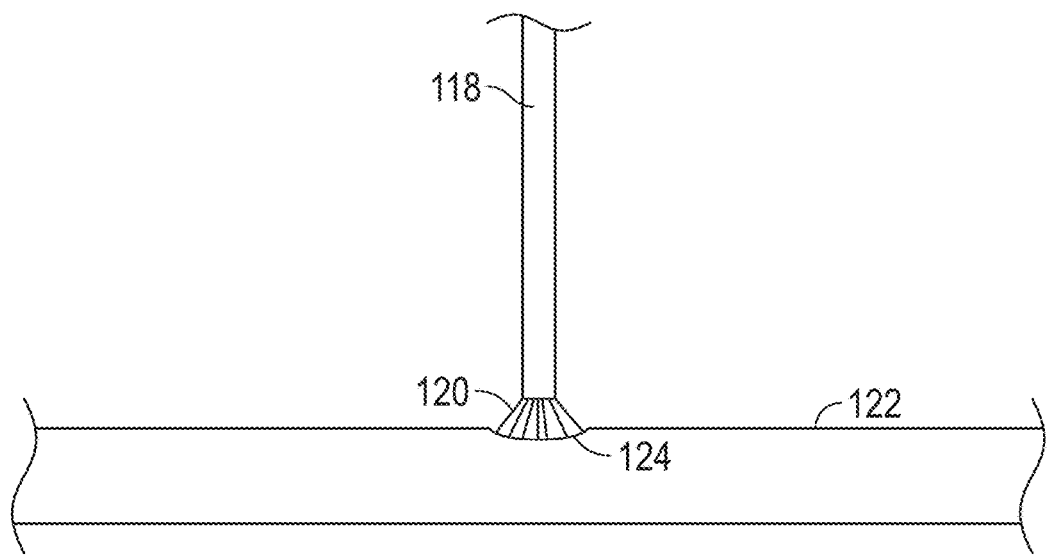
FIG. 10A is a pictorial representation of a cold spray method for a hydraulic line in accordance with an illustrative embodiment.
Figure 10B:
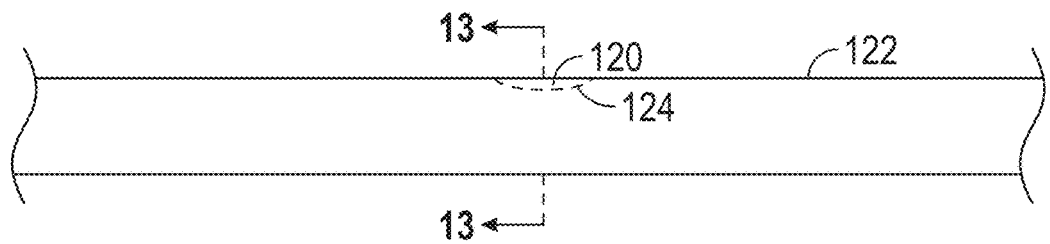
FIG. 10B is a pictorial representation of a sectional view of the hydraulic line shown in FIG. 10A in accordance with an illustrative embodiment.
Figure 13:
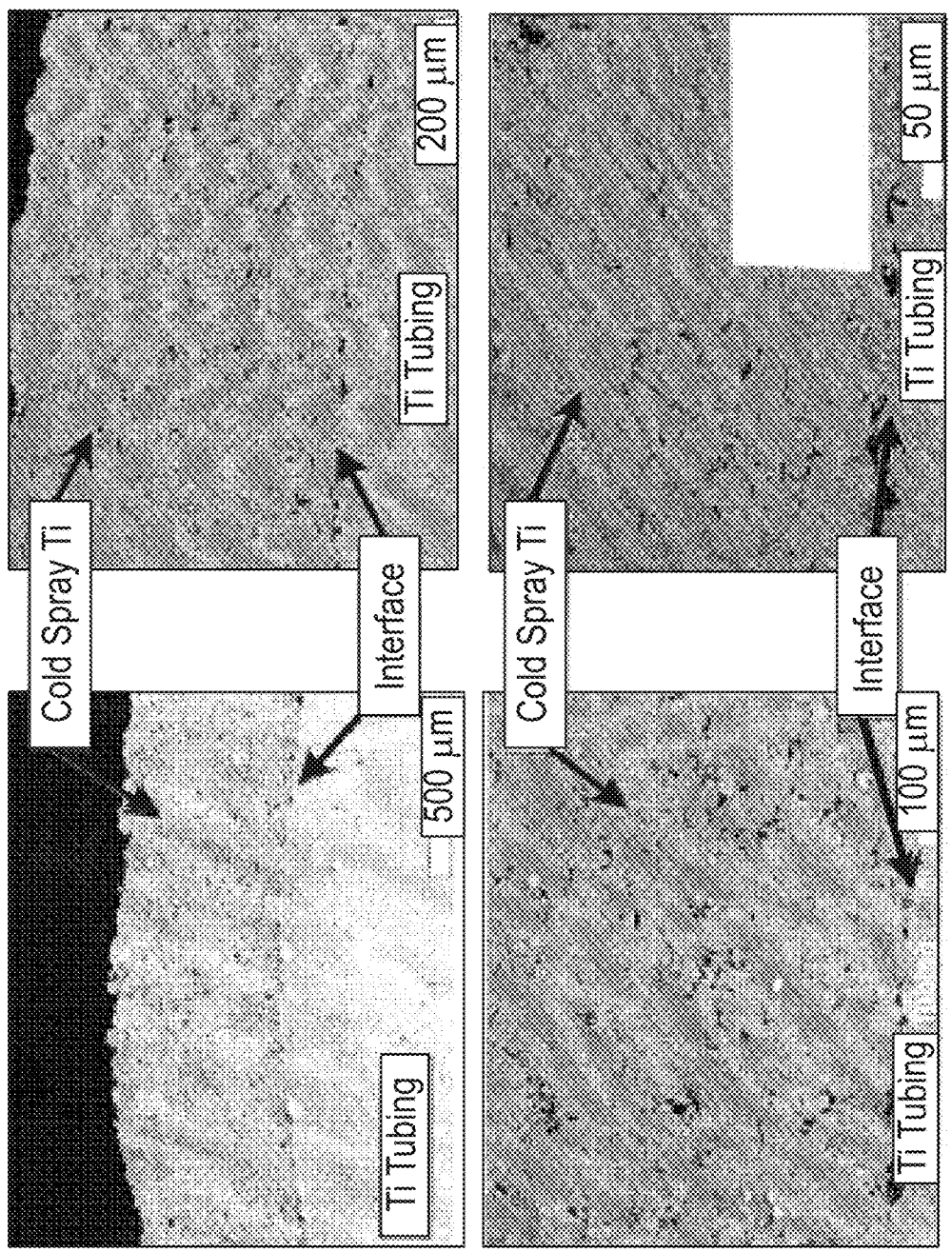
FIG. 13 is a pictorial representation of exemplary metallographs showing cold spray application on the tubing in accordance with an illustrative embodiment.

FIGS. 10A-10B provide pictorial illustrations for repair and reclamation of the hydraulic line 122, such as those illustrated in FIGS. 11-12. Using cold spray methods provided, for example, in FIGS. 14A-14B, a cold spray material 120 is applied to a chaff point 124 on a hydraulic line 122 by discharging the cold spray material 120 from a cold spray nozzle 118. This repair and reclamation of the hydraulic line 122 may be performed in situ (i.e., where the hydraulic line 122 remains connected within the aircraft and is not removed) or on the hydraulic line after it is removed from service. In either case, the speed at which the repair can be made does not require the aircraft to be out of service for any significant amount of time. Given that the cold spray methods shown and illustrated in FIGS. 14A-14B are highly maneuverable and compact, the cold spray nozzle 118 can be positioned relative to the chaff point 124 at generally any location aboard an aircraft to repair and reclaim the hydraulic line. This high degree of mobility, maneuverability and positionability of the cold spray nozzle 118 allows the cold spray repair and reclamation process to be used in situation where other techniques simply could not be performed due to space, position and location constraints. FIG. 10B provides a pictorial illustration of a completed repair and reclamation of a hydraulic line 122. The removed or shaped material at the chaffing point 124 is replaced with cold spray material 120 which provides a protective layer or coating over the chaff point that forms a strong mechanical and metallurgical bond with the substrate material (i.e., the hydraulic line 122). FIG. 13 provides pictorial illustrations of a set of exemplary metallographs taken along line 13-13 in FIG. 10B, which illustrate the strong mechanical and metallurgical bond that occurs between the interface of the hydraulic line and the cold spray material.

TABLE 1

Cold Spray Titanium Experimental Trials

| AP&C Powder | Accushape Powder | Tekna Powder |
|---|---|---|
| 500 C./300 C. Helium (nozzle clogging @400 C.) | 500 C./500 C. Helium (no nozzle clogging) | 500 C./500 C. Helium (no nozzle clogging) |
| Density = 95.1% | Density = 99.0% | Density = 92.0% |
| Adhesion to Ti6AI4V > 10K | Adhesion to Ti6AI4V > 10K | Adhesion to Ti6AI4V > 10K |
| Hardness = 225 Vickers | Hardness = 211 Vickers | Hardness = 212 Vickers |
| 91.5 HRB | 92.6 HRB | 92.9 HRB |

Table 1 provides experimental results using exemplary materials, pressures and temperatures for cold spray repair and reclamation of hydraulic lines. By way of example, several powder materials are illustrated in Table 1. Testing temperatures and pressures for each powder are provided in Table 1. For example, helium at 400 psi and 500 psi may be used in the cold spray deposition repair and reclamation process. The main gas temperature may be operated at 500° C. and the powder gas temperature may be operated in between 200° C. and 500° C., by way of example. Deposition efficiencies exceed 65% and the density range for the deposition range was between 95.1% up to 99%. Hardness ranges for the deposition were between 211 and 225 Vickers. The bond strength between the hydraulic line substrate and the deposition (e.g., between 6061 aluminum and Ti6AI4V) exceeded 10,000 psi. Table 2 provides exemplary bond strength results using various exemplary powder materials on material specific substrates for the hydraulic line.

TABLE 2

Coating Adhesion Experimental Results

| Powder | Substrate | UTS (psi) | | |
|---|---|---|---|---|
| Accushape CP-Ti | 6061 Aluminum | 10870 | 11233 | Glue |
| Accushape CP-Ti | Ti6AI4V | 12087 | 11626 | Glue |
| Accushape CP-Ti | 6061 Aluminum | 12134 | 10396 | Glue |
| AP&C CP-Ti | 6061 Aluminum | 11703 | 9785 | Glue |
| AP&C CP-Ti | Ti6AI4V | 10128 | 7166 | Glue |
| AP&C CP-Ti | 6061 Aluminum | 6144 | 6196 | Glue/Adhesive/Cohesive |

Embodiments of the present invention provide cold spray repair and reclamation for both aluminum aircraft skin fasteners holes and hydraulic lines for aircraft, and specifically for the USAF B-1 bomber. Results successfully showed adequate deposition efficiency, bond strength, density and hardness.

The illustrative embodiments provide systems and methods for repair and reclamation of aircraft skin fastener holes and hydraulic lines. Each of the embodiments may be combined in any number of combinations and such combinations are expected and utilized. The number of combinations and alternative embodiments is not limited nor intended to be limited based on the included disclosure.

The previous detailed description of a small number of embodiments for implementing the invention and is not intended to be limited in scope. The following claims set forth a number of embodiments of the invention disclosed with greater particularity.

What is claimed is:

1. A method for cold spraying metal aircraft panels comprising:
   providing:
      a cold spray system comprising an enclosed dry powder source housing a dry powder, a gas source for a gas and an accelerant, and a mixing manifold, wherein the enclosed powder source has a gas source input connected in operable communication with a gas line having a gas line pressure for receiving the gas from the gas source;
      a gas-powder line operably connected to the dry powder source, the gas source and the mixing manifold;
      a gas-powder mixture outlet connected in operable communication with the gas-powder line for receiving a gas-powder mixture from within the enclosed dry powder source, wherein the gas source input and the gas-powder mixture outlet operate at the gas line pressure using the gas from the gas source;
      an accelerant line carrying the accelerant from the gas source and operably connected to the gas source and the mixing manifold;
      a cold spray gun assembly consisting of a gas-powder-accelerant mixture hose having a hose length for carrying a gas-powder-accelerant mixture a distance from the mixing manifold, an input end operably connected to the mixing manifold and an output end operably connected to a cold spray gun, wherein the cold spray gun is positionable away from the mixing manifold by extending the hose length;
   identifying a worn fastener hole in metal aircraft panel in need of repair, wherein the metal aircraft panel has opposite top and bottom surfaces and at least one axis of curvature following a contour of the aircraft and the worn fastener hole extends through the top and bottom surface and includes a chamfered surface formed during fabrication of the metal aircraft panel, and wherein as a result of use of the metal aircraft panel the worn fastener hole and chamfered surface include one or more dimensions outside original manufacturer dimensions and tolerances;
   capturing a location of the worn fastener hole;
   moving the cold spary gun into position adjacent the worn fastener hole without moving the mixing manifold;
   orienting a nozzle of a cold spray gun assembly at the worn fastener hole generally perpendicular to the chamfered surface;
   communicating the gas-powder-accelerant mixture from the mixing manifold through the gas-powder-accelerant mixture hose to an input side of the cold spray gun assembly;

depositing cold spray material about the worn fastener hole and chamfered surface to replace metal worn away from use of the metal aircraft panel; and removing any excess cold spray material from the worn fastener hole and chamfered surface for matching the original manufacturer dimensions and tolerances.

2. The method of claim 1 further comprising:
recutting a chamfer into the fastener hole by removing deposited cold spray material.

3. The method of claim 1 further comprising at least one of:
   a. preparing the fastener hold for cold spray adherence;
   b. grinding the cold spray material flush with the metal aircraft panel;
   c. repainting the metal aircraft panel.

4. The method of claim 1 wherein the metal aircraft panel further comprises a separate inner composite layer.

5. The method of claim 1 further comprising:
directing cold spray deposition by:
   a. hand;
   b. automation.

6. The method of claim 1 wherein the metal aircraft panel and cold spray material are aluminum.

7. A method for cold spraying hydraulic lines comprising:
providing:
   a cold spray system comprising a dry powder source housing a dry powder, a gas source for a gas and an accelerant, and a mixing manifold, wherein the powder source has a gas source input connected in operable communication with a gas line having a gas line pressure for receiving the gas from the gas source;
   a gas-powder line operably connected to the dry powder source for receiving the dry powder, the gas source for receiving the gas and the mixing manifold for receiving a gas-powder mixture;
   a gas-powder mixture outlet connected in operable communication with the gas-powder line for receiving a gas-powder mixture from within the dry powder source, wherein the gas source input and the gas-powder mixture outlet operate at the gas line pressure using the gas from the gas source;
   an accelerant line carrying the accelerant from the gas source and operably connected to the gas source and the mixing manifold;
   a cold spray gun assembly consisting of a gas-powder-accelerant mixture hose having a hose length for carrying a gas-powder-accelerant mixture from the mixing manifold a distance from the mixing manifold through the hose length, an input end operably connected to the mixing manifold and an output end operably connected to a cold spray gun, wherein the cold spray gun is positionable away from the mixing manifold and in close proximity to hydraulic line by extending the hose length;
identifying a surface of a hydraulic line in need of repair;
aiming the cold spray gun at the surface of the hydraulic line;
depositing cold spray material onto the surface of the hydraulic line; and
removing any excess cold spray material.

8. The method of claim 7 further comprising:
reclaiming the hydraulic line in situ.

9. The method of claim 7 wherein the hydraulic line comprises an aircraft hydraulic line.

10. The method of claim 7 further comprising:
carrying the gas-powder-accelerant mixture through the gas-powder-accelerant mixture hose to the cold spray gun from a location of the dry powder source and gas source to a separate location proximate the hydraulic line.

11. The method of claim 7 further comprising:
articulating the cold spray gun by:
   a. hand;
   b. automation.

12. The method of claim 7 further comprising:
mobilizing the method for making an in situ repair to the hydraulic line.

13. A cold spray repair method comprising:
providing a cold spray system consisting of a dry powder source housing a dry powder, a gas source for a gas and an accelerant, and a mixing manifold, wherein the dry powder source has a gas source input connected in operable communication with a gas line from the gas source having a gas line pressure controlled by a gas controller for receiving the gas from the gas source at the gas line pressure;
a gas-powder line operably connected to the dry powder source, the gas source and the mixing manifold;
a gas-powder mixture outlet connected in operable communication with the gas-powder line for receiving a gas-powder mixture from within the dry powder source, wherein the gas source input and the gas-powder mixture outlet operate at the gas line pressure using the gas from the gas source;
an accelerant line carrying the accelerant from the gas source and operably connected to the gas source and the mixing manifold;
a cold spray gun having a gas-powder-accelerant mixture hose having a hose length for carrying a gas-powder-accelerant mixture a distance from the mixing manifold, an input end operably connected to the mixing manifold and an output end operably connected to a cold spray gun, wherein the cold spray gun is positionable away from the mixing manifold by extending the hose length;
heating the gas from the gas source;
moving the dray powder from the powder source through the gas-powder line at a pressure above atmospheric pressure;
mixing the heated gas and the dry powder creating a heated gas-powder mixture;
combining upstream before the input side of the spray gun assembly the heated gas-powder mixture with the accelerant from the gas source;
communicating the gas-powder-accelerant mixture together through the gas-powder-accelerant mixture hose to the input side of the cold spray gun; and
discharging the gas-powder-accelerant mixture from a discharge side of the cold spray gun onto a surface of a repair part for making a repair.

14. The method of claim 13 wherein the repair part comprises an aircraft component.

15. The method of claim 14 further comprising:
repairing the aircraft component in situ while still connected to the aircraft.

16. The method of claim 13 wherein the repair part comprises an aircraft panel and the surface comprises a chamfered fastener hole.

17. The method of claim 16 further comprising:
performing the repair of the chamfered fastener hole by discharging the gas-powder accelerant mixture onto the chamfered fastener hole in the aircraft panel to repair any wear.

18. The method of claim 13 wherein the repair part comprises a hydraulic line and the surface comprises an outer surface.

19. The method of claim 18 further comprising:
performing the repair of the hydraulic line by discharging the gas-powder-accelerant mixture onto the outer surface of the hydraulic line to repair any wear.

20. The method of claim 13 further comprising:
communicating the dry powder from the dry powder source and accelerating the heated gas-powder mixture with the accelerant from the gas source.

\* \* \* \* \*

UNITED STATES PATENT AND TRADEMARK OFFICE
CERTIFICATE OF CORRECTION

PATENT NO. : 10,099,322 B2
APPLICATION NO. : 14/066443
DATED : October 16, 2018
INVENTOR(S) : Widener et al.

Page 1 of 1

It is certified that error appears in the above-identified patent and that said Letters Patent is hereby corrected as shown below:

Column 10 Line 59, Claim 1, Line 42, change "spary" to --spray--

Column 12 Line 45, Claim 13, Line 30, change "dray" to --dry--

Signed and Sealed this
Fourth Day of December, 2018

Andrei Iancu
*Director of the United States Patent and Trademark Office*